United States Patent [19]

Kellor

[11] 4,147,810

[45] Apr. 3, 1979

[54] TREATMENT OF VEGETABLE PROTEIN

[75] Inventor: Richard L. Kellor, Excelsior, Minn.

[73] Assignee: Cargill, Incorporated, Minneapolis, Minn.

[21] Appl. No.: 518,766

[22] Filed: Oct. 29, 1974

Related U.S. Application Data

[63] Continuation-in-part of Ser. No. 282,541, Aug. 21, 1972, abandoned.

[51] Int. Cl.$^2$ ................................................ A23J 3/10
[52] U.S. Cl. .................................... 426/629; 426/656; 426/516
[58] Field of Search ............... 426/618, 622, 623, 626, 426/629, 630, 634, 635, 559, 560, 656, 446–449, 516, 520

[56] References Cited

U.S. PATENT DOCUMENTS

| | | | |
|---|---|---|---|
| 3,142,571 | 7/1964 | McAnelly | 426/448 |
| 3,480,442 | 11/1969 | Atkinson | 426/448 |

*Primary Examiner*—Norman Yudkoff
*Attorney, Agent, or Firm*—Fitch, Even, Tabin & Luedeka

[57] ABSTRACT

A process is provided for the manufacture of animal feed and food supplements from vegetable protein materials. In the process a vegetable protein material is comminuted to provide a meal or flour. An edible acid is dispersed in the comminuted vegetable protein material to provide an acidified protein substrate having a controlled level of moisture. The acidified, moisture containing substrate is then heated to an elevated temperature for a specified period of time.

11 Claims, No Drawings

TREATMENT OF VEGETABLE PROTEIN

The present application is a continuation-in-part of U.S. patent application Ser. No. 282,541, filed Aug. 21, 1972, now abandoned.

The present invention relates generally to a process for the treatment of vegetable protein. More particularly, the present invention relates to a process for treating vegetable protein materials, such as soybeans, so as to improve the nutritive value when used for animal feed.

Various methods are known for treating vegetable protein, particularly soybean protein, so as to improve the characteristics of the vegetable protein for use as a feed or as a food supplement. For example, it is known to process soy flour with moist heat, which is sometimes called cooking. The treatment of soy flour by particular heating conditions is referred to as a toasting process. The cooking and toasting process improves the palatibility and nutritive value of the soy flour.

It is also known, as disclosed in an article by B. M. Colvin and H. A. Ramsey, J. Dairy Science, Volume 51, No. 6, pages 898-904, that soy flour may be treated with acid to improve its nutritive value when fed to calves. In the method of the Colvin and Ramsey article, a dilute aqueous soy flour suspension is treated by adding phosphoric and hydrochloric acid thereto so as to reduce the pH of the soy flour suspension to 4.0. The acidified soy flour suspension is then incubated for a period of five hours, with stirring, at a temperature of 37° C. After the incubation treatment, the suspension is cooled to 4° C. and stored until used for calf feeding. It was reported in the Colvin and Ramsey article that such acid treatment of soy flour suspension improves the nutritive value of the soy flour for young calves.

The treatment of soy flour with anhydrous hydrogen chloride and anhydrous ammonia was reported by H. A. Ramsey at the North Carolina State University Nutrition Conference (1970). In the method reported, dry soy flour was placed in a stainless steel drum. The loaded drum was covered and slowly rotated to tumble the soy flour. During rotation, anhydrous hydrogen chloride or anhydrous ammonia was infused slowly into the drum. Following treatment, the soy flour was fed to calves, and an improvement in nutritional value when compared to untreated soy flour was reported.

While the conventional cooking or toasting method for treating vegetable protein, particularly soy flour, provides improved results in respect to palatibility and nutritive value, it is not wholly desirable in that such treated materials are not digested or utilized well by calves and are not optimum for feeding monogastric animals. The aqueous acid treatment method of Colvin and Ramsey is time consuming and is not commercially practical in that the finished product is a dilute suspension which cannot be readily stored or transported. While drying of the aqueous suspension is feasible, such drying requires additional process steps and equipment that raise the cost of the process. The anhydrous hydrogen chloride anhydrous ammonia treatment reported by Ramsey is undesirable in that control of the process is difficult and palatibility of the product may be decreased.

It would be desirable to provide a simple and inexpensive method for treating vegetable protein to improve its palatibility, nutritive value, and digestibility for use in animal feed compositions.

Accordingly, it is a principal object of the present invention to provide a process for manufacture of a food or feed supplement from vegetable protein materials. It is another object of the present invention to provide a process for treating vegetable protein so as to improve the nutritive value thereof. It is a further object of the present invention to provide a simple inexpensive process for the manufacture of a feed or food supplement from vegetable protein, particularly soybean protein, wherein the palatibility, the nutritive value, and digestibility of the vegetable protein material is enhanced. It is a still further object of this invention to provide an animal feed supplement from soybean protein which provides enhanced and unexpected weight gain in calves.

These and other objects of the present invention will become more apparent from the following detailed description.

Generally, in accordance with various features of the invention, a process is provided for the manufacture of feed and food supplements from vegetable protein materials In the process, a vegetable protein material is provided and the vegetable protein material is comminuted to provide a meal or flour. An edible acid is then dispersed in the comminuted vegetable protein source to provide a protein substrate. The moisture of the acidified protein substrate is controlled to provide a particulate substrate. The acidified, moisture containing substrate is then heated to an elevated temperature for a specified period of time. This treatment of the acidified and moisturized protein substrate with heat causes the nutritive value and digestibility of the protein material to become improved over that obtained by treatment of the protein material by known prior art methods.

The rate and extent of the reaction which causes improvement in nutritional value is believed to be dependent upon temperature, particle size, reaction time, and concentration of acid and moisture of the vegetable protein substrate. It is believed that these variables are interdependent and control of the treatment of the vegetable protein material is effected by selection of conditions within the range for each variable as set forth hereinbelow to provide a protein material with particular features in terms of palatibility, nutritive value and digestibility.

After the treatment of the vegetable protein source, in accordance with the invention as described above, a food and feed supplement is provided which has a substantially enhanced palatibility, nutritive value, and digestibility when compared to the vegetable protein material prior to the treatment or to the vegetable protein material treated by known prior art methods, such as toasting, incubation of an acidified, dilute aqueous slurry or treatment at ambient temperature and pressure with anhydrous hydrogen chloride or ammonia.

Vegetable protein materials contain a number of enzymes and frequently they contain various anti-growth factors. Soybean materials characteristically contain urease, which catalyzes the hydrolysis of urea to ammonia and carbon dioxide and the so-called trypsin inhibitor, or anti-tryptic factor, which interferes with the digestion of proteins by the intestinal proteolytic enzyme, trypsin. Urease can be determined very simply by measuring changes in pH because of ammonia formation. Because urease can be measured easily and because urease is inactivated by heat, it is common to use urease activity as a measure of the extent of heat processing.

While not wishing to be bound by any theory, it is believed that three principal effects are caused by the treatment of the present invention and these effects are, in part, responsible for the improved palatability, nutritional value and digestibility of the feed supplement of the invention. These effects are the increase in the level of protein denaturation, the reduction of the activity of trypsin inhibitor and other anti-nutritional factors in the soy flour, and the hydrolysis of undigestible and difficult to digest polysaccharides and oligosaccharides to lower molecular weight, more digestible sugars, including monosaccharides.

The proteins of many native vegetable protein materials, such as soybeans or cottonseed, are extracted readily by water. The term denaturation is used to describe various irreversible changes in physical characteristics of proteins. Such irreversible changes can be caused by application of heat and heat processed vegetable protein materials having reduced extractability are commonly said to be denatured. The degree of denaturation is measured commonly by the protein dispersibility index, referred to herein as PDI, which is the percentage of the total protein extracted by water in an arbitrary mixing and separation procedure. A method for determining PDI is described in American Oil Chemists' Society (AOCS) Official Method Ba 10-65. The extent of denaturation is also measured by the extent of reduction in enzyme activity such as the reduction in the urease activity, trypsin inhibitor activity or lipoxygenase activity. In general, as the PDI is decreased, the level of denaturation is increased and the digestibility of the material in monogastric animals, such as calves, is improved. Untreated soy flour may have a PDI approaching 100, whereas commercially toasted soy flour may have a PDI as low as 20. However, as the PDI of soy flour is lowered, by coventional heat treatment processes, to levels of less than about 10 there is a tendency for the nutritive value of the soy flour to also be decreased because heat damage to the protein.

When soy flour is treated according to the present invention there is an increase in the level of denaturation as determined by PDI, urease inactivation and reduction in trypsin inhibitor activity.

Hydrolysis of oligosaccharides to lower molecular weight sugars including monosaccharides is an important result of the treatment of the invention. Specifically, stachyose, raffinose, and sucrose are believed to be hydrolyzed to various simpler monosaccharide sugars, which are referred to herein as hexoses.

It is believed that the improved animal growth effect of the feed supplement of the invention is related to the increase in level of protein denaturation (reduction of PDI), to the reduction of trypsin inhibitor and other anti-nutritional components and to the increase in the more digestible sugars, including hexoses. Young calves are known to have difficulty in digesting the complex carbohydrates present in soy flour such as stachyose, raffinose and sucrose. Breakdown of these complex sugars in soybean materials and the increase in simple sugars such as hexose sugars leads to major improvements in digestibility and utilization. The breakdown of oligosaccharides may also contribute to a reduction in flatulence.

In general, any vegetable protein material may be treated by the process of the present invention. However, the process of the invention is particularly suitable for treating soybean protein materials and various aspects of the invention are hereinafter described with particular reference to the treatment of soybean protein. It should, however, be understood that the process of the invention is equally suitable for treatment of other vegetable protein materials.

The vegetable protein should be in the form of a meal or flour for use in the process of the invention. In this connection, full-fat, low-fat and defatted soy flour or soybean meal may be used. Full-fat soy flour contains all of the fat originally present in soybean seeds. Low-fat soy flour is made from the pressed cake obtained from a continuous screw-press method of removing oil from soybeans, or by adding fatty material back to defatted flour. If oil is added to low fat soy flour, the resultant flour is termed refatted flour. Addition and lecithin provides lecithinated soy flour, and often blends of oil and lecithin are used.

Defatted soy flour is made from flakes obtained from the solvent extraction of oil from soybean seeds. All soy flour materials are commonly prepared from dehulled soybeans.

In general, the three types of soybean flours described above have the following approximate compositions:

| Component | Defatted Soy Flour | Low-Fat Soy Flour | Full Fat Soy Flour |
|---|---|---|---|
| Protein (N × 6.25) | 52.5 | 49.5 | 41.1 |
| Moisture | 6.0 | 6.0 | 6.0 |
| Fat | 1.0 | 6.5 | 20.5 |
| Fiber | 3.0 | 2.8 | 2.5 |
| Ash | 6.0 | 5.7 | 4.9 |
| Carbohydrate | 31.5 | 29.5 | 25.0 |
| Oligosaccharides Total | 15.0 | 14.5 | 12.3 |
| Oligosaccharide Breakdown: | | | |
| Sucrose | 8.2 | 8.0 | 6.7 |
| Raffinose | 1.2 | 1.1 | 1.0 |
| Stachyose | 5.6 | 5.4 | 4.6 |

The particle size of the vegetable protein material is not of great importance and coarse meals and flakes may be used although it is preferred to have a finer particle size to facilitate treatment. Also, if the product is neutralized subsequent to the treatment of the invention, the dispersion and penetration of alkaline neutralizing agents into the particles is facilitated. It is preferred that the largest particles of the soybean protein material are small enough to pass through a screen having a mesh size of 16 mesh, U.S. Standard sieve size.

The edible acid is selected from the group consisting of hydrochloric acid, phosphoric acid, sulphuric acid, acetic acid, lactic acid, citric acid and the like, and is preferably hydrochloric acid, phosphoric acid, and mixtures thereof. The edible acid should be at a concentration sufficiently high so that the amount of water introduced into the soy flour by the acid to provide acidified soy flour substrate increases the moisture concentration by less than 35 percent by weight of the soy flour substrate. The soy flour substrate retains the character of a particulate material and should have the general characteristics and handling properties of a solid, particulate material. All percentages used herein are percent by weight, unless otherwise stated.

The edible acid is added to the soy flour at a level sufficient to establish a pH of from about 1.0 to 5.5 in the soy flour. Preferably the acid is added at a level sufficient to establish a pH in the range of from about 3 to about 5. As used herein, the term pH refers to the pH that is obtained when a 10 percent by weight, dry basis, dispersion of soy flour solids in water is prepared.

In a preferred embodiment of the present invention commercial, concentrated hydrochloric acid, phosphoric acid, and mixtures thereof are used. To attain a homogenous dispersion of the concentrated acid in the soy flour, it may sometimes be necessary to dilute the acid with water. However, it should be understood that no additional water is required to be added to the soy flour except for the purpose of attaining a uniform dispersion of the acid or to provide lubricating properties when subsequent steps in the method of the present invention are effected by means of extrusion. The extrusion method will be described in greater detail hereinafter. Total moisture added to the soy flour substrate should be limited to less than about 35 percent. If the moisture exceeds about 35 percent a dough-like material is formed and the particulate character is lost. It should be understood that the formation of a dough inhibits the improvements attained by the method of the present invention in respect to palatability, nutritive value and digestibility from taking place.

At levels of moisture higher than about 28 percent the soy flour substrate tends to form a dough unless the PDI of the soy flour substrate is reduced prior to adding the water to the soy flour substrates. Natural soy flour generally has a PDI of about 90. The PDI can be reduced by toasting in accordance with known methods. In general, if the moisture added to the soy flour is greater than about 28 percent but less than 35 percent the PDI of the soy flour substrate should be less than about 50. As previously indicated, however, it is preferred that the moisture added to the soy flour substrate be as low as possible and no moisture need be added to the soy flour substrate except to attain uniform dispersion of the acid or to provide lubricity for the extrusion process. It is particularly preferred to establish an acidified soy flour substrate having added moisture in the range of from about 5 to about 28 percent. The limiting of the amount of added moisture is also desirable in that subsequent drying steps are more economical.

After acidification of the soy flour has been effected, the soy flour substrate is subjected to heating so as to increase the temperature of the soy flour substrate to within the range of from about 250° F. to about 450° F. Preferably, particularly for the extrusion method, the temperature of the soy flour is increased to a temperature in the range of from about 275° F. to about 400° F. The soy flour is maintained at the elevated temperature for at least 1 minute and preferably for a period of time within the range of from about 1 minute to about 30 minutes. It will be readily understood that to attain a temperature within the indicated range, it is necessary to establish pressure during the heating step. Unless pressure is established the moisture present in the soy flour substrate prevents the temperature of the soy flour substrate from exceeding the boiling temperature of water at atmospheric pressure, i.e. 212° F. However, it should also be understood that the presence of pressure is not required to provide the benefits of the present invention in respect to improved nutritional value of the soy flour substrate treated in accordance with the method of the invention except for the purpose of providing conditions suitable for attaining a temperature within the above indicated range.

While not wishing to be bound by any theory, it is believed that the presence of acid during the heat treatment step provides conditions suitable for increasing the protein digestibility and nutritive value of the soy protein substrate and also provides conditions which are suitable for effecting hydrolysis of oligosaccharides to simpler sugars. In particular, the method of the present invention provides a means for increasing the PER of soy protein to a level of more than 2.0 and also increasing the amount of free hexose sugars to a level of greater than about 3.5. In this connection, natural soy protein has a PER of about 1.5 and a free hexose level of about 0.1 to about 0.5 percent by weight. By "free hexose level" is meant the level of those hexose and other simple monosaccharide sugars which are not tied up or otherwise bound to other naturally occurring components of the soy flour, and which can be determined by a liquid chromatographic process as hereinafter described. The PER determinations referred to in the present invention are made by the procedure described as A.O.A.C. Method §§ 39.166 to 39.170 from the Eleventh Edition, 1970, A.O.A.C. Methods of Analyses.

It is believed that the results of the method of the present invention in terms of increasing the nutritive value, digestibility and palatability of a soy protein substrate are due to the provision of an acidified protein substrate in particulate condition which is adapted to be treated by high heat for a limited period of time. The unique selection of conditions in respect to pH, moisture, temperature and time establishes the conditions suitable for providing an increase in PER to a level of greater than 2.0 while also establishing the conditions suitable for effecting hydrolysis of the oligosaccharide sugars and increasing the level of hexose sugars to greater than about 3.5.

Hexose sugars are determined by an analytical liquid chromatography process. In the process, an analytical, high pressure liquid chromatograph, Waters Associates Model ALC/GPC 502/401 chromatograph equipped with a Model 46 K injector is used. In the determination, 5.0 grams of the soy flour to be tested is placed in a 50 ml bottle and 25 ml of distilled water is added to the bottle. The bottle is capped and shaken at room temperature for 30 minutes. Thereafter, the contents of the bottle are transferred into a 50 ml centrifugal tube and the sample is centrifuged at high speed for a period of time sufficient to produce a clear top liquid.

The following chromatographic conditions are used: 30 cm long × ¼ inch OD column ($\mu$ Bondapak/Carbohydrate); Mobile phase—87.5% acetonitrile, 17.5% $H_2O$; Flow rate—1.5 ml/min. 1500 psi; Refractive Index Detector—×8.

50 microliters each of a standard 1% by weight solution of fructose and of glucose is inserted in the column for analysis of hexose sugar extracts when the expected hexose level is 3% by weight or more. If the expected level is less than 3% by weight, 0.2% by weight standard solutions of fructose and glucose are used. The chromatograph is attenuated (×8) to produce a large enough peak to measure peak height easily. Thereafter, 50 microliters of the clear liquid from the centrifuge water extract obtained from the soy flour is under the same conditions as when the standard solutions of fructose and glucose were inserted and the peak height for the sample is measured. The fructose and glucose levels are determined by the following calculations:

$$\% \text{ fructose} = \% \text{ standard fructose} \times \frac{\text{pk ht sample}}{\text{pk ht std}} \times \frac{25 \text{ ml}}{5 \text{ gm}}$$

-continued $$\% \text{ glucose} = \% \text{ standard glucose} \times \frac{\text{pk ht sample}}{\text{pk ht std}} \times \frac{25 \text{ ml}}{5 \text{ gm}}$$

As previously indicated, while the acidified soy flour is maintained at the elevated temperature, the soy flour is subjected to superatmospheric pressure required to attain the desired temperature. The pressure is at least equivalent to the vapor pressure of water at the lowest elevated temperature useful in the treatment. The pressure may be developed by subjecting the soy flour substrate to heating in a closed system so that the vapor pressure of the moisture in the soy flour substrate creates the pressure. The heat treatment causes the moisture to develop steam. As indicated, it is believed that the steam in the presence of the acid causes acid hydrolysis of complex sugars and denaturation of the protein.

In general, pressure developed during the heating step will be at least about 15 psig, corresponding to heating in a closed system to 250° F. The pressure may be increased to very high levels and still provide the improved vegetable protein of the invention. In this connection the pressure may be increased to a level of up to at least 10,000 psig without any detrimental effects. Pressures higher than the vapor pressure of water at the temperature of treatment may be established by the introduction of an inert gas into a closed system or by mechanical means, such as by extrusion through a small orifice.

After the heating step, soy flour which is treated with lower levels of acid in the range of pH 4 to 5.5 may be used directly without neutralization or may be neutralized with edible alkaline agents such as sodium hydroxide, sodium carbonate, potassium hydroxide, potassium carbonate, calcium hydroxide and the like. If processing is effected under more acidic conditions where the pH of the soy flour substrate is within the range of from about 1.0 to 4, the treated product is preferably neutralized and used or it may be neutralized, dried and stored.

A preferred method for effecting the heat treatment of the acidified soy flour substrate is to pass the soy flour substrate through a suitable extrusion apparatus, such as a Wenger Extruder. A Wenger Extruder consists of a tapered spiral auger which is located in a jacketed housing. The auger accepts the material to be extruded at the large end of the auger and transmits and ejects the extruded material from a one or more orifices located at the smaller end of the auger. During passage of the material along the length of the auger, the pressure is increased by compaction of the material and the temperature is also increased by frictional heat produced by mechanical working and by introduction of a heating medium into the jacket. For moisture containing material, as the temperature reaches the boiling point of water steam is evolved and the pressure within the extruder is increased to at least the vapor pressure of steam at the temperature of the material. The material is also subjected to very high pressure as it is compacted and forced through the orifices at the end of the extruder. Exit pressures of from about 200 psig to about 10,000 psig are obtained with acidified, moist vegetable protein materials.

As indicated, some added moisture is desirable to provide lubricity for an extrusion process. In this connection, added moisture in the range of from about 5 to about 28 percent is desirable for the extrusion process. It should be understood that the soy protein substrate must be in the form of a particulate material at the time that it is introduced into the extrusion apparatus. If the soy protein substrate contains sufficient moisture to form a dough, the extrusion process cannot be used. Also, heating of the soy protein substrate in the form of a dough in an autoclave does not result in providing the improvement in nutritional properties which is provided by the process of the present invention. During the extrusion process, the acidified soy flour substrate is compacted and the soy flour substrate exits from the orifice of the extruder in the form of a crumbly rod. The rod may be cut into pellets which are easily broken to provide a particulate material. Even under the conditions of extrusion, that is, high pressure and heat, the soy flour substrate does not form a dough-like material and the material exiting from the extruder does not have dough-like cohesivness. The material exiting from the extruder is easily broken to again provide a particulate material.

After the soy flour has been treated by heat in the presence of acid as described above, the soy flour may be used immediately as a feed supplement. The feed supplement has palatibility, nutritive value, and digestibility characteristics greater than the initial starting material and in some cases has a nutritive value of at least twice as great as the starting material. The feed supplement may be used immediately after the heating step or the feed supplement may be dried. For use in some feed rations, it has been found desirable to neutralize the feed supplement but such neutralization is not always necessary. Neutralization may be effected by spraying the treated soy flour with a concentrated alkaline solution and neutralization is preferably sufficient to provide a final product having a pH within the range of from about 5.0 to about 7.5. For most uses it is desirable to regrind the product to remove lumps and provide a final material having a uniform particle size.

The following examples further illustrate various features of the present invention, but are intended to in no way limit the scope of the invention which is defined in the appended claims.

EXAMPLE I

Solvent extracted, defatted, soy flour was acidified by the addition of a mixture of hydrochloric acid and phosphoric acid thereto. Three parts of commercial concentrated hydrochloric and one part of commercial concentrated phosphoric acid were blended the mixture of acids was added to the soy flour at a level sufficient to establish a pH of 4.2 and provide an acidified soy flour substrate containing 10 percent added moistures.

The soy flour substrate was fed into the mixing chamber of a Wenger Extruder at a rate of 3000 lbs. per hour. Steam was introduced into the jacket of the extruder to heat the soy flour substrate as it advanced through the extruder. The temperature of soy flour substrate was 275° F. at the start of the extrusion and was controlled at 325° F. during most of the advance of the soy flour through the extruder. The residence time of the soy flour in the extruder was approximately 3 minutes. The soy flour exited from the extruder at a temperature of 325° F. and under a pressure of about 1000 psig through an orifice plate containing twenty ⅜ inch holes. A rotating knife was used to cut the exiting strands of soy flour into pellets. The pellets were easily crumbled to provide a coarse powder.

After the processing steps described above, the material which exited from the extruder was neutralized with sodium hydroxide to provide a feed supplement product having a pH of 5.5. The product was then dried to a moisture level of 8 percent and was milled to provide a flour. The soy flour tested by the chromatography process described above had the following composition in respect to the saccharides present:

|  | WEIGHT PERCENT | |
| --- | --- | --- |
| SACCHARIDE | BEFORE TREATMENT | AFTER TREATMENT |
| Stachyose | 5.5% | 1.0% |
| Raffinose | 1.2% | 0.3% |
| Sucrose | 6.9% | 4.1% |
| Hexoses | 0.3% | 4.5% |

As can be seen from the above saccharide analysis, the oligosaccharide and disaccharide content of the soy flour has been substantially reduced by the treatment of Example I and the oligosaccharides have been broken down to simpler materials.

The modified soy flour feed supplement produced by the above method was then tested by feeding to calves over a period of 1 month. The feed formula was as follows:

| INGREDIENT | WEIGHT PERCENT |
| --- | --- |
| Soy Flour Material | 25 |
| Animal Fat | 10 |
| Cheese Whey | 60 |
| Vitamin Premix | 5 |

The treated soy flour supplement of the present invention, which has a PDI of 15, was used in the above formulation and was compared with an identical formulation containing commercial toasted soy flour having a PDI of 30. At the conclusion of the feeding test, it was determined that the treated soy flour of the present invention provided weight gains at least 25 percent greater than the control soy flour which has not been treated in accordance with the invention.

EXAMPLE II

The soy flour treated in Example I was used as a feed supplement in a formulation used to feed calves. The weight gain in the calves which were fed a milk replacer product, wherein the protein was derived solely from dairy products, was compared with a milk replacer product which contained 15 percent by weight of the soy flour treated in accordance with Example I. Both formulations contain 24 percent protein and 10 percent animal fat. After 6 weeks of feeding tests, the following weight gains were obtained.

| Formulation | Average Weight Gain Calf Pounds |
| --- | --- |
| Control Diet (all dairy protein) | 36.6 |
| Test Diet (containing 15 percent modified soy flour) | 45.6 |

From the above it can be seen that the treated soy flour of the present invention provides a feed supplement which can be used to replace dairy derived protein in milk replacer formulations for calves.

It will be appreciated that various modifications may be made in the process of the present invention without departing from the scope of the invention. In particular, it will be appreciated that the level of improvement in nutritive value is dependent upon the level of acid used, the amount of heating that is effected and the amount of pressure that is established during the heating step. Some improvement in nutritive value may be established by using parameters outside those described in the specification of the present invention and those vegetable proteins which have been only slightly improved in nutritive value may be useful for some purposes.

What is claimed is:

1. A process for treating vegetable protein so as to improve the nutritive value thereof comprising providing a particulate, soy bean material dispersing an edible acid in said soy bean material to provide an acidified soy bean substrate having a pH of from about 1.0 to about 5.0, controlling the moisture in said acidified substrate at a level of from about 5 percent to about 35 percent by weight of said substrate so that said substrate remains particulate and heating said substrate to an elevated temperature of from about 250° F. to about 450° F. for a time sufficient to increase the free hexose level to above about 3.5 percent and to provide a PER above about 2.0.

2. A process in accordance with claim 1 wherein said edible acid is selected from the group consisting of hydrochloric acid, phosphoric acid, sulphuric acid, acetic acid, lactic acid, citric acid and mixtures thereof.

3. A process in accordance with claim 1 wherein said edible acid is selected fom hydrochloric acid, phosphoric acid and mixtures thereof.

4. A process in accordance with claim 1 wherein said substrate is maintained at said elevated temperature for a period of time of within about 1 minute to about 30 minutes.

5. A process in accordance with claim 1 wherein said heating step takes place in a closed system.

6. A process in accordance with claim 1 wherein said heating step takes place in a continuous system.

7. A process in accordance with claim 6 wherein said continuous system is an extruder.

8. A process for treating a vegetable protein derived from soybeans so as to improve the nutritive value thereof comprising providing a particulate soybean material, dispersing an edible acid in said soybean material in an amount sufficient to provide an acidified particulate soybean substrate having a pH between about 4.0 and about 4.5, controlling the added moisture in said substrate between about 5 percent and about 28 percent by weight, conveying said acidified moisture-containing substrate through an extruder while heating said substrate to an elevated temperature of from about 275° F. to about 400° F., and subjecting said substrate in said extruder to an elevated pressure of from about 30 psig to about 10,000 psig while at said elevated temperature so as to increase the PER of said soybean material to above about 2.0 and to increase the free hexose level to above about 3.5 percent.

9. A process in accordance with claim 8 wherein said extruded substrate is neutralized to a pH in the range of from about 5.0 to about 5.5.

10. A treated vegetable protein material having a PER of above about 2.0 and a free hexose level of above about 3.5.

11. Treated vegetable protein material in accordance with claim 10 wherein said vegetable protein material is derived from soybeans.

* * * * *